July 7, 1936. K. J. TOBIN 2,046,855
AUTOMOBILE HOLD-DOWN DEVICE
Filed March 19, 1932   2 Sheets-Sheet 1
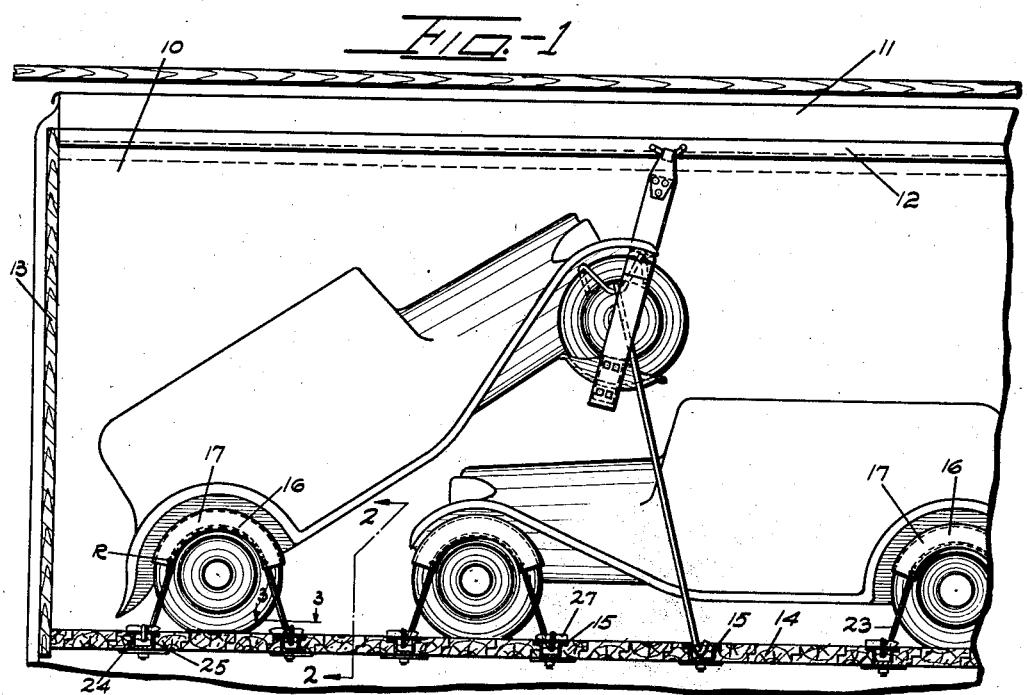
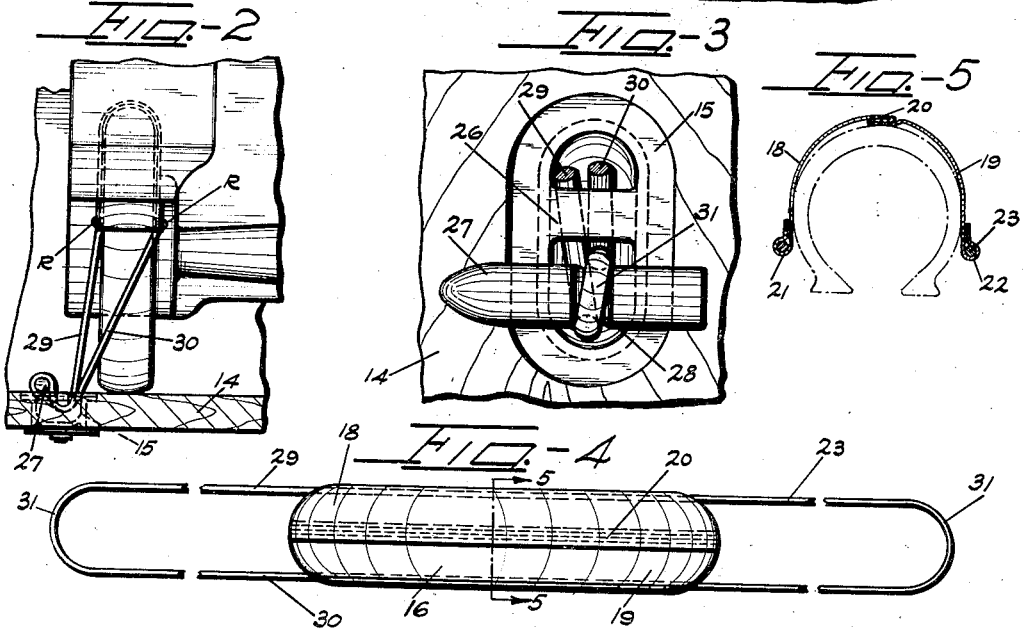
~INVENTOR~
KENNETH J. TOBIN
By~ Samuel Reese
ATTY.

July 7, 1936.  K. J. TOBIN  2,046,855
AUTOMOBILE HOLD-DOWN DEVICE
Filed March 19, 1932   2 Sheets-Sheet 2
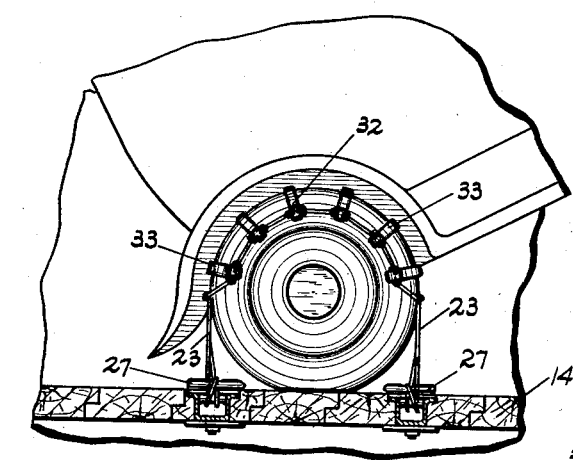
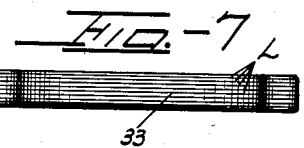
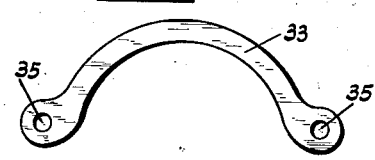
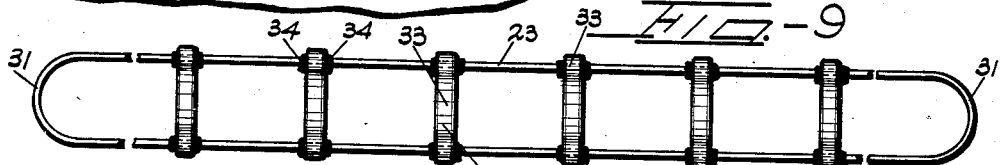
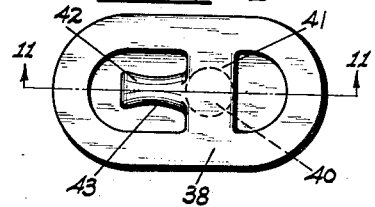
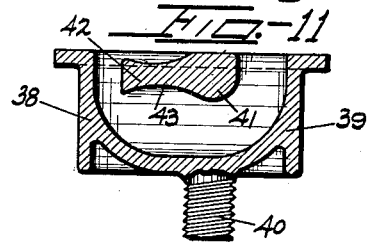
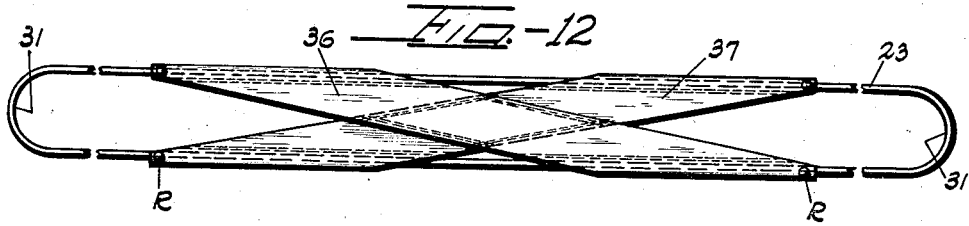
~INVENTOR~
KENNETH J. TOBIN
By~ Samuel Reese
ATTY.

Patented July 7, 1936

2,046,855

UNITED STATES PATENT OFFICE 2,046,855

AUTOMOBILE HOLD-DOWN DEVICE

Kenneth J. Tobin, Chicago, Ill., assignor, by mesne assignments, to Evans Products Company, Detroit, Mich., a corporation of Delaware Application March 19, 1932, Serial No. 599,858

6 Claims. (Cl. 105—368)

This invention relates to automobile hold-down devices and concerns itself more particularly with such devices adapted, through engagement with the wheels of automobiles, to secure said automobiles for shipment in transportation vehicles.

It is an object of this invention to provide hold-down devices for automobiles embodying simplicity and economy of construction, light weight, strength and ease of application and disengagement.

A further object is to provide hold-down devices for automobiles having intermediate wheel engaging portions and end portions for attachment to the floors of carrier vehicles.

A further object is to provide hold-down devices for automobiles constructed of flexible materials permitting said devices to be readily folded into a small mass.

A further object is to provide hold-down devices for automobiles constructed of inexpensive non-metallic flexible materials, whereby said hold-down devices may be discarded after once serving their intended purpose.

A further object is to provide an anchoring device adapted to be secured to the floor of a carrier vehicle with which the hold-down devices of the instant invention may readily be engaged.

Further objects of this invention will become clear as the description thereof proceeds.

In the drawings

Figure 1 is a partial longitudinal sectional view of a railway freight car with parts thereof omitted, illustrating the invention applied to two automobiles positioned in said car for shipment therein.

Figure 2 is a sectional view taken on line 2—2 of Figure 1.

Figure 3 is a horizontal sectional view taken on line 3—3 of Figure 1.

Figure 4 is a top plan view of the hold-down device of the invention.

Figure 5 is a section taken on line 5—5 of Figure 4, showing in dot and dash lines the sectional contour of a tire.

Figure 6 is a fragmentary enlarged detailed view of a modified form of the invention.

Figure 7 is a top plan view of one of the stirrups utilized in the form of the invention illustrated in Figure 6.

Figure 8 is a front elevation of the stirrup illustrated in Figure 7.

Figure 9 is a top plan view of the hold-down device shown in Figure 6.

Figure 10 is a top plan view of a modified form of anchoring device.

Figure 11 is a sectional view taken on line 11—11 of Figure 10.

Figure 12 is a top plan view of a further modification of the hold-down device.

Referring to the drawings and, first, to Figures 1 to 5, inclusive, the numeral 10 indicates generally a railway house car provided with a roof 11, side plates 12, end walls 13 and a floor 14 within which automobiles may be transported. The floor of the car is provided with a plurality of spaced anchoring devices 15 with which the hold-down devices of the instant invention may be engaged for the purpose of retaining the automobiles to be shipped in said car against movement therein.

The hold-down devices, indicated generally by the numeral 16, are adapted for engagement with the wheels of the automobile supported by the floor of the car in order to maintain said automobiles substantially stationary with respect to said floor. The hold-down devices in the embodiment considered are provided with intermediate wheel engaging members 17, preferably formed of strips of canvas, adapted to embrace a portion of the wheels of the automobile. As clearly illustrated in Figures 4 and 5 the intermediate wheel engaging member 17 may be formed of two strips of canvas 18 and 19 stitched or otherwise connected together by a plurality of rows of stitching 20. It is to be observed that the member 17 is so formed as to approximate the contour of the wheel. The opposite sides of the member 17 are folded upon themselves as indicated at 21 and 22 and then stitched or otherwise secured to the member 17. The folds 21 and 22 are adapted to receive a fastening cable or rope 23 which preferably is endless. It is to be understood, of course, that ends may be provided if desired on the rope or cable. The wheel engaging member 17 is retained against movement relative to the rope 23 by means of rivets R or the like.

In the operative position of the hold-down device 16 the intermediate wheel engaging member 17 is placed upon the wheel in embracing relationship thereto. The fastening cable or rope extends downwardly from the opposite ends of the member 17 and is adapted for engagement with adjacent anchoring devices 15. Each of the anchoring devices is substantially channel shaped in section, the walls 24 and 25 of the anchoring device being connected at the upper margins thereof by a cross member 26. This engagement between the fastening ropes and the anchoring devices secured to the floor of the freight car 10 is effected by passing the terminals of the fastening ropes under the cross member 26 and passing a pin 27 through the loops formed at the terminals of the endless rope so as to interlock said pins and said fastening ropes, said pins extending across the anchoring devices. Prior to the placement of an anchoring device upon a wheel of an automobile, said wheel is deflated so as to insure ready interlocking engagement between the pins and the loops through which they extend. After such engagement has been effected the wheel is inflated so as to place the anchoring device under tension whereby movement of the wheel relative to the floor upon which it is supported is prevented. As clearly illustrated in Figure 3 of the drawings, the pin is preferably provided with a groove 28 so as to prevent disengagement of the pin from its corresponding loop.

Attention is invited to the fact that in the embodiment of the invention considered, as well as in the modified forms thereof, the construction of the hold-down device and the means for retaining the terminals permit of a decrease in the effective length of the hold-down device. This will become apparent upon a consideration of the illustration of Figure 3 of the drawings. The runs 29 and 30 of the rope or cable 23 are engaged with the anchoring device 15 through engagement with the cross members 26. These runs, as clearly shown in Figure 3, pass downwardly from their connection with the wheel engaging member 17 under the cross member 26 and then upwardly for interlocking engagement with the pin 27. It will be evident without further illustration that the loop 31 at the terminal of the rope 23 may be extended so as to cross above the cross member 26 of the anchoring device and pass between the runs 29 and 30 of the fastening rope. In this position of the loop 31 the pin may be inserted through said loop and when the hold-down device has been drawn taut or placed under tension it will be firmly anchored to the devices 15. It is apparent, therefore, that without the introduction of additional means the effective length of the anchoring device may be varied to meet varying sizes of automobile wheels.

A modified embodiment of the invention is illustrated in Figures 6 to 9, inclusive, of the drawings. In this embodiment of the invention the endless fastening rope or cable 23 providing the terminal loops 31 is retained. The intermediate wheel engaging portion of the hold-down device 32 is formed of a plurality of spaced stirrups 33 preferably constituted of fibrous material. The stirrups 33 are maintained in their desired position upon the runs 29 and 30 of the fastening rope 23 by means of knots 34 or the like positioned adjacent opposite sides of said stirrups. The stirrups illustrated are preferably laminated as indicated at L, the laminations of which may be wood, papier-mâché or any desired fibrous material. The opposite ends of each of the stirrups 33 are provided with openings 35 through which the runs of the fastening rope extend. The application of the anchoring device illustrated in Figures 6 to 9, inclusive, of the drawings, to the automobile wheel, its securement to the floor of the carrier vehicle and the attainment of the taut engagement between the anchoring device and said wheel are the same as described for the anchoring device illustrated in Figures 1 to 5, inclusive, of the drawings.

A further embodiment of the invention relating to the hold-down device is illustrated in Figure 12 of the drawings. In this embodiment, as in the first embodiment of the invention described, the intermediate wheel engaging portion is formed essentially of canvas material. Strips 36 and 37 of this material are utilized, these strips extending diagonally of each other and being preferably stitched together at their intersections. The ends of the strips are folded around the runs of the rope 23 and secured thereto against displacement in the manner set forth in the description of the first embodiment of the hold-down device. The manner of use of the form of hold-down device illustrated in Figure 12 of the drawings in its application to an automobile wheel and in its securement to the floor of a carrier vehicle follows that of the previous embodiments of the invention.

In the attachment of the terminals of the rope incorporated in the hold-down devices illustrated a separate pin has been utilized for interlocking engagement with the loops provided at the terminals of the rope. The modified form of anchoring device 38 illustrated in Figures 10 and 11 of the drawings dispenses with said pins and, in lieu thereof incorporates as an integral portion thereof, structure whereby the interlocking engagement with the loops of the rope 23 for the purpose set forth is obtained. The modified anchoring device 38 includes the substantially channel shaped body portion 39 provided with a downwardly extending threaded shank 40 similar to the corresponding portions of the anchoring device 15. A cross member 41, similar to the cross member 26 of the anchoring device 15, extends between and connects the upper margins of the walls of the body portion 39. Extending substantially centrally of the anchoring device 38 and longitudinally thereof from the cross member 41 is a pin or lug 42 having preferably a central portion 43 of reduced dimension. The extent of the pin or lug 42 is such that sufficient space is provided between the free end of said pin and the adjacent end of the body portion of the anchoring device to permit insertion of a loop of the rope 23 of the hold-down device between the aforesaid ends for direct interlocking engagement with the pin or lug 42. It is apparent, however, that a loop 31 may be passed under the cross member 41 and then extended upwardly and interlockingly engaged with the pin or lug 42 so as to decrease the effective length of the hold-down device. It is manifest that the modified form of anchoring device eliminates the possibility of loss of the separate pins 27.

It is believed to be clear from the foregoing that an inexpensive and effective hold-down device for automobiles transported in carrier vehicles is provided by the instant invention. Such hold-down device may be used repeatedly but, because of the economy of its construction, effects a considerable saving over the hold-down devices now in use, even if it be discarded after only one application.

By the term "wheel" used throughout the specification and the claims it is intended to include the tire employed on automobile wheels.

Manifestly, numerous changes and modifications in the details of the embodiments of the invention disclosed will become apparent to those skilled in the art. It is intended that all such changes and modifications be comprehended within the scope of the invention which is to be limited only by the claims appended hereto.

I claim:

1. In combination, a carrier vehicle having a floor, spaced anchoring devices secured to said floor, said anchoring devices comprising a body portion having spaced walls and a member connecting said walls, an automobile positioned in said vehicle and means for securing the wheels at one end of said automobile substantially stationary relative to said floor, said means comprising a member embracing each of said wheels, flexible fastening means having endless terminals secured to said members and extending therefrom, the terminals of said fastening means in the operative position thereof passing between the walls of the anchoring device and below said connecting member and means extending through said terminals for the purpose set forth.

2. In combination, a carrier vehicle having a floor, spaced anchoring devices secured to said floor, said anchoring devices comprising a body portion having spaced walls and a member connecting said walls, an automobile positioned in said vehicle and means for securing the wheels at one end of said automobile substantially stationary relative to said floor, said means comprising a flexible member embracing each of said wheels, flexible fastening means having endless terminals secured to said members and extending therefrom, the terminals of said fastening means in the operative position thereof passing between the walls of the anchoring device and below said connecting member and means extending through said terminals for the purpose set forth, said means comprising members provided with grooves and said terminals lying in said grooves.

3. In combination, a carrier vehicle having a floor, anchoring means secured to said floor, a member provided on said anchoring means, an automobile positioned in said vehicle with the wheels at one end of said automobile supported upon the floor of the vehicle, a member embracing each of said wheels, flexible fastening means provided with loops extending from said last-named members, said fastening means extending under said members of said anchoring means in engagement therewith and means extending through said loops for maitaining said engagement.

4. In combination, a carrier vehicle having a floor, anchoring means secured to said floor, a member provided on said anchoring means, an automobile positioned in said vehicle with the wheels at one end of said automobile supported upon the floor of the vehicle, a member embracing each of said wheels, flexible fastening means provided with loops extending from said last-named members, said fastening means extending under said members of said anchoring means in engagement therewith and means provided on said anchoring means extending through said loops for maintaining said engagement.

5. An automobile hold-down device comprising a plurality of spaced arcuate fibrous cross members, the ends of which are provided with openings, ropes threaded through said openings and means for limiting sliding movement of said members upon said ropes.

6. In combination, a carrier vehicle having a floor, spaced anchoring devices secured to said floor, said anchoring devices comprising a body portion having spaced walls and a member connecting said walls, an automobile positioned in said vehicle and means for securing the wheels at one end of said automobile substantially stationary relative to said floor, said means comprising a member embracing each of said wheels, flexible fastening means having looped terminals secured to said members, said terminals in the fastening position of said means passing between said walls of the anchoring device and below said connecting member and a pin integral with each of said connecting members, lying between said walls and extending through the looped terminals for the purpose set forth.

KENNETH J. TOBIN.